United States Patent
Hashizume

(10) Patent No.: US 9,521,447 B2
(45) Date of Patent: Dec. 13, 2016

(54) VEHICULAR VIDEO PROCESSING DEVICE AND VEHICULAR VIDEO PROCESSING SYSTEM

(71) Applicant: DENSO CORPORATION, Kariya, Aichi-pref. (JP)

(72) Inventor: Takashi Hashizume, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/646,042

(22) PCT Filed: Nov. 21, 2013

(86) PCT No.: PCT/JP2013/006831
§ 371 (c)(1),
(2) Date: May 20, 2015

(87) PCT Pub. No.: WO2014/083808
PCT Pub. Date: Jun. 5, 2014

(65) Prior Publication Data
US 2015/0304700 A1    Oct. 22, 2015

(30) Foreign Application Priority Data
Nov. 30, 2012    (JP) .................................. 2012-262547

(51) Int. Cl.
*H04N 7/18*    (2006.01)
*H04N 21/414*    (2011.01)
(Continued)

(52) U.S. Cl.
CPC ...... *H04N 21/41422* (2013.01); *G09G 3/3406* (2013.01); *G09G 5/00* (2013.01);
(Continued)

(58) Field of Classification Search
CPC ........ G09G 3/3406; G09G 5/00; G09G 5/006; G09G 5/008; G09G 5/363; G09G 5/391; G09G 2340/0442; G09G 2340/06; G09G 2380/10; H04N 5/04; H04N 5/268; H04N 7/01; H04N 21/440218
See application file for complete search history.

(56) References Cited

U.S. PATENT DOCUMENTS 4,689,526 A * 8/1987 Schweer ........................ 315/371
5,506,797 A * 4/1996 Koshiba ........................ 708/272
(Continued)

FOREIGN PATENT DOCUMENTS

EP        0 825 610 A1    2/1998
JP        H04-329171 A    11/1992
(Continued)

OTHER PUBLICATIONS

International Search Report and Written Opinion of the International Searching Authority dated Feb. 15, 2014 issued in the corresponding International application No. PCT/JP2013/006831 (and English translation).
(Continued)

*Primary Examiner* — Oleg Asanbayev
(74) *Attorney, Agent, or Firm* — Posz Law Group, PLC

(57) ABSTRACT

A vehicular video processing device includes a clock output unit and an output unit. A video signal output from an external video device via a video signal receiving unit and having predetermined format and first bit width is inputted to the vehicular video processing device together with a first clock signal. The clock output unit outputs a second clock signal having a frequency acquired by multiplying first clock signal frequency by a predetermined multiplier factor. The output unit converts the video signal having the first bit width to a video signal having a second bit width smaller than the first bit width according to the multiplier factor, and outputs the converted video signal together with the second clock signal. With above-described device, image process- (Continued)

ing can be properly performed to a video signal having a format difficult to be directly input or output.

13 Claims, 6 Drawing Sheets

(51) Int. Cl.
G09G 3/34 (2006.01)
G09G 5/00 (2006.01)
G09G 5/36 (2006.01)
G09G 5/391 (2006.01)
H04N 5/04 (2006.01)
H04N 5/268 (2006.01)
H04N 7/01 (2006.01)
H04N 21/4402 (2011.01)

(52) U.S. Cl.
CPC ............ *G09G 5/006* (2013.01); *G09G 5/008* (2013.01); *G09G 5/363* (2013.01); *G09G 5/391* (2013.01); *H04N 5/04* (2013.01); *H04N 5/268* (2013.01); *H04N 7/01* (2013.01); *H04N 21/440218* (2013.01); *G09G 2340/0442* (2013.01); *G09G 2340/06* (2013.01); *G09G 2380/10* (2013.01)

(56) References Cited

U.S. PATENT DOCUMENTS

2006/0140036 A1* 6/2006 Yamamoto .................... 365/222
2008/0309474 A1* 12/2008 Okamoto et al. ............. 340/462

FOREIGN PATENT DOCUMENTS

| JP | H11-196283 A | 7/1999 |
| JP | 2000-022986 A | 1/2000 |
| JP | 2000-332780 A | 11/2000 |
| JP | 2001-359052 A | 12/2001 |
| JP | 2003-271115 A | 9/2003 |

OTHER PUBLICATIONS

"Video Decoder and Display Processor" ADV7166, Analog Devices, Inc., 2012.

* cited by examiner

FIG. 3

BEFORE CONVERSION 33MHz

| R5 |
|----|
| R4 |
| R3 |
| R2 |
| R1 |
| R0 |
| G5 |
| G4 |
| G3 |
| G2 |
| G1 |
| G0 |
| B5 |
| B4 |
| B3 |
| B2 |
| B1 |
| B0 |

FIG. 4

AFTER INSERT ZERO

| |
|---|
| R7 ←R5 |
| R6 ←R4 |
| R5 ←R3 |
| R4 ←R2 |
| R3 ←R1 |
| R2 ←R0 |
| R1 ←0 |
| R0 ←0 |
| G7 ←G5 |
| G6 ←G4 |
| G5 ←G3 |
| G4 ←G2 |
| G3 ←G1 |
| G2 ←G0 |
| G1 ←0 |
| G0 ←0 |
| B7 ←B5 |
| B6 ←B4 |
| B5 ←B3 |
| B4 ←B2 |
| B3 ←B1 |
| B2 ←B0 |
| B1 ←0 |
| B0 ←0 |

FIG. 5

×2 (MULTIPLIER FACTOR) 66MHz

| G4 | R7 |
|----|----|
| G3 | R6 |
| G2 | R5 |
| B7 | R4 |
| B6 | R3 |
| B5 | G7 |
| B4 | G6 |
| B3 | G5 |

FIG. 6

×3 (MULTIPLIER FACTOR) 99MHz

| R7 | G7 | B7 |
|----|----|----|
| R6 | G6 | B6 |
| R5 | G5 | B5 |
| R4 | G4 | B4 |
| R3 | G3 | B3 |
| R2 | G2 | B2 |
| R1 | G1 | B1 |
| R0 | G0 | B0 |

VEHICULAR VIDEO PROCESSING DEVICE AND VEHICULAR VIDEO PROCESSING SYSTEM

CROSS REFERENCE TO RELATED APPLICATION

This application is a U.S. national stage of International Application No. PCT/JP2013/006831 filed on Nov. 21, 2013 and is based on Japanese Patent Application No. 2012-262547 filed on Nov. 30, 2012, the disclosures of which are herein by reference.

TECHNICAL FIELD

The present disclosure relates to a vehicular video processing device that receives and processes multiple video input signals, and further relates to a vehicular video processing system that performs a video signal processing using the vehicular video processing device.

BACKGROUND ART

In recent years, the video processing technique has developed with development of digital technology. A technique of a video processing device is disclosed in, for example, patent literature 1. Patent literature 1 discloses a system having a DVD player, a TV monitor system, and the like. When TV monitor system receives a TVSystem as data from the DVD player, the TV monitor system compares the data with a present TVSystem. When the data is different from the present TVSystem, the TV monitor system outputs control signals, which are based on a newly switched system, to ICs including a composite RGB conversion IC and a timing controller.

According to above-described method, information corresponding to a recording system, such as National Television System Committee (NSC) or Phase Alternating Line (PAL), used in the DVD player can be transmitted to the TV monitor system via a local area network (LAN) line, and the TV monitor system can switch the video processing circuit or the like in accordance with the recording system. Therefore, automatic switching can be performed at an optimum timing, and manual switching becomes unnecessary.

The vehicular video processing system is connected to, for example, external devices, such as a navigation device, an AV (Audio Visual) board, and an outside image taking camera disposed. The vehicular video processing system receives and processes video signals transmitted from the external devices. The vehicular video processing system are required to be adapted to a number of such video input systems.

On the other hand, at the time of developing vehicular devices, product development has been performed using conventional customized devices. However, with development of multimedia technology of portable information terminals, smartphones, and the like in recent years, it is becoming more demanded to use a main CPU having high supportability for different systems of above-described various portable information terminals. This kind of main CPU has high market liquidity and general versatility, and can reduce the development cost of various peripheral circuits, programs, and the like.

On the contrary, since above-described kind of main CPU has low customization performance, there are various limitations at the time of use. In particular, when the main CPU has small number of input system, such as one channel, and an input bit width of the input system is set to, for example, eight bits (second bit width) and is smaller than an input bit width (first bit width) of a video system which has an input bit width of 18 bits, there may occur various limitations to the main CPU. Accordingly, the main CPU becomes difficult to perform a video process by using an existing technique.

PRIOR ART LITERATURES

Patent Literature

[Patent Literature 1] JP 2001-359052 A

SUMMARY OF INVENTION

In view of the foregoing difficulties, it is an object of the present disclosure to provide a vehicular video processing device that can properly perform an image processing to a video signal having a specific video format difficult to be directly input from an external video device or output to an external destination device due to a bit width of the video format. It is another object of the present disclosure to provide a vehicular video processing system that performs an image processing using the vehicular video processing device.

According to a first aspect of the present disclosure, a vehicular video processing device includes a clock output unit and an output unit. The vehicular video processing device receives a video signal output from an external video device via a video signal receiving unit. The video signal has a predetermined video format and a first bit width, and is transmitted together with a first clock signal. The clock output unit outputs a second clock signal having a frequency acquired by multiplying a frequency of the first clock signal by a predetermined multiplier factor. The output unit converts the video signal having the first bit width to a video signal having a second bit width in accordance with the multiplier factor, and outputs the video signal that is converted to have the second bit width together with the second clock signal. The second bit width is smaller than the first bit width.

With above device, an image processing can be properly performed to a video signal, which has a specific video format difficult to be directly input from an external video device or output to an external destination due to a bit width of the video format.

According to a second aspect of the present disclosure, a vehicular video processing system includes the vehicular video processing device according to the first aspect, a video signal receiving unit, and a main central processing unit. The video signal receiving unit is connected to the vehicular video processing device. The video signal receiving unit receives a video signal from an external video device, converts the video signal that is received to a video signal having a predetermined video format and a first bit width, and outputs the video signal that is converted to the vehicular video processing device. The main central processing unit receives, from the vehicular video processing device, a video signal having a second bit width.

With above system, an image processing can be properly performed to a video signal, which has a specific video format difficult to be directly input from an external video device or output to an external destination due to a bit width of the video format.

BRIEF DESCRIPTION OF DRAWINGS

The above and other objects, features and advantages of the present invention will become more apparent from the following detailed description made with reference to the accompanying drawings. In the drawings:

FIG. 3 is a diagram illustrating a video output format of a navigation device before a format conversion;

FIG. 4 is a diagram illustrating video signals after zero insertion by a zero inserting unit;

FIG. 5 is a diagram illustrating a corresponding relation (first example) between multiplier factor and an output format of a format converting unit;

FIG. 6 is a diagram illustrating a corresponding relation (second example) between multiplier factor and an output format of a format converting unit.

EMBODIMENTS FOR CARRYING OUT INVENTION

The following will describe a vehicle mounted device to which the present disclosure is applied as an embodiment of the present disclosure with reference to the drawings.

First Embodiment

Figure 2:
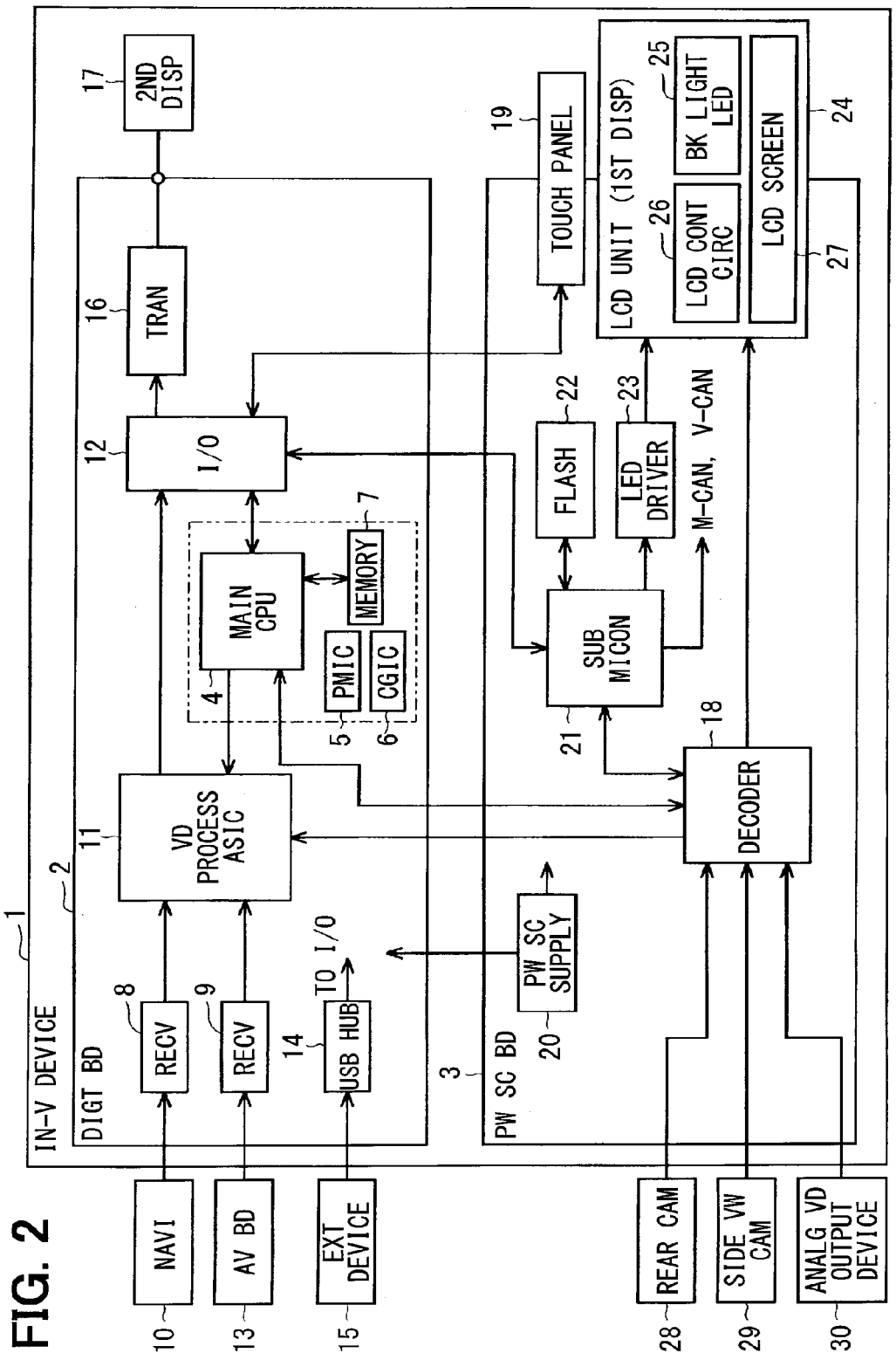
FIG. 2 is a block diagram schematically illustrating an electric configuration of a vehicular video processing system according to an embodiment of the present disclosure.

As illustrated in FIG. 2, an in-vehicle device (IN-V DEVICE) 1 is constructed so as to be able to be mounted on a vehicle (not illustrated) and is constructed by assembling a digital board (DIGT BD) 2 and a power source board (PW SC BD) 3. The in-vehicle device 1 may be a device which is attached to a vehicle in a fixed manner or a device which is attached to a vehicle in a detachable manner. The digital board 2 and the power source board 3 are electrically connected to each other via a wire, and power and data can be transferred between electric elements amounted on the boards 2 and 3.

In the following description, signal processing circuits in a video processing system will be mainly described and description of a sound processing system will be omitted. The digital board 2 includes a main central processing unit (CPU) 4, a power management integrated circuit (PMIC) 5 paired with the main CPU 4, a clock generate integrated circuit (CGIC) 6, a memory (MEMORY) 7, and the liked. The digital board 2 includes receivers (RECV) 8 and 9 receiving video signals from various video systems, a video processing ASIC (VD PROCESS ASIC) 11 as an example of a vehicular video processing device, an I/O unit (I/O) 12, a USB hub (USB HUB) 14, and the like.

The main CPU 4 is, for example, a general CPU of a single-core or dual-core type CPU which operates at an operating frequency in the range of 1 GHz to 2 GHz. The main CPU 4 includes an embedded secondary cache. The main CPU 4 is generally available in the market, and has high market liquidity and high general versatility. The memory 7 is used as a main storage device. The main CPU 4 performs a control related to the video processing by executing an operation program.

The receiver 8 receives a single channel (system) video signal from a navigation device (NAVI) 10 connected as an external device. When the navigation device 10 outputs a video signal according to low voltage differential signaling (LVDS) to the receiver 8, the receiver 8 performs serial to parallel convert to the LVDS signal and acquires a video signal in digital RGB (DRGB) format (RGB666) and outputs the conversion signal to the video processing ASIC 11.

The receiver 8 is also able to convert a signal format and output a converted signal, for example, convert a video signal format to a YUV format in accordance with a switch signal corresponding to a signal received from an external device (for example, a switch signal output from the main CPU 4) and output the converted video signal to the video processing ASIC 11. The details of signal conversion will be omitted. The receiver 8 outputs a signal in RGB666 format to the video processing ASIC 11. When the video processing ASIC 11 selects one channel to receive a signal and outputs the received signal to the I/O unit 12, the receiver 8 converts the video format to RGB565 format by removing a part of the information included in the received signal.

As it is known, even the data dropout is considered, the video signal of the navigation device 10 in DRGB format has less video deterioration than the video signal in YUV format. Thus, the receiver 8 outputs the video signal to the video processing ASIC 11 in DRGB format.

The receiver 9 receives two channel video signals from an audio visual board (AV BD) 13 connected as the external device according to the LVDS. Then, the receiver 9 performs serial to parallel conversion to the LVDS signal, and outputs the conversion signal to the video processing ASIC 11. The AV board 13 is, for example, a device which outputs a video signal according to the Blu-ray Disc (registered trademark) standard. When the receiver 9 receives a video signal, the receiver 9 performs a serial to parallel convert to the received video signal and acquires a video signal in YUV422 format, and outputs the conversion signal to the video processing ASIC 11.

The video processing ASIC 11 functions as an example of the vehicular video processing device according to the embodiment. The video processing ASIC 11 receives video signals from the receivers 8 and 9, switches the video signals of transmitted in multiple channels (systems), and outputs the converted signals to the I/O unit 12. The details will be described later. The USB hub 14 receives a video signal transmitted from an external connection device (EXT DEVICE) 15, which is connected to the video processing device at an external side. Then, the USB hub 14 outputs the video signal to the I/O unit 12.

The I/O unit 12 receives signals from the video processing ASIC 11, the USB hub 14, and the like. The I/O unit 12 performs input and output control and outputs a video signal according to the LVDS to a transmitter (TRAN) 16 in response to a command signal transmitted from the main CPU 4. The transmitter 16 outputs the video signal according to the LVDS to a second display unit (2ND DISP) 17 connected at an external side. The display unit 17 performs a display process according to the received video signal.

The I/O unit 12 and the main CPU 4 are connected via a peripheral component interconnect (PCI) Express X16 bus. The main CPU 4 receives a video signal, which is transmitted from the video processing ASIC 11, via the I/O unit 12. Further, the main CPU 4 outputs multiple channel video signals to the I/O unit 12 using serial digital video out (SDVO) via the same bus that receives the video signal from the video processing ASIC 11.

The main CPU 4 outputs drawing data in DRGB format to a decoder (DECODER) 18 mounted on the power source board 3. The process of the decoder 18 will be described later. The I/O unit 12 is electrically connected to a touch panel unit (TOUCH PANEL) 19 mounted on the power source board 3, and inputs or outputs a touch signal to or from another hardware device (main CPU 4).

On the power source board 3, a power source supply unit (PW SC SUPPLY) 20 is mounted, and the power source supply unit 20 receives power source voltage supplied from an in-vehicle battery (not illustrated). In response to an operation made to an ACC switch (not illustrated) by the user, the power source supply unit 20 supplies power for operation to electric elements mounted on the digital board 2 and on the power source board 3. On the power source board 3, in addition to the decoder 18 and the touch panel unit 19, a sub microcomputer (SUB MICON) 21, a flash memory (FLASH) 22, a light emitting diode driver (LED DRV) 23, and a liquid crystal display unit (LCD UNIT) 24 are mounted. The LCD unit 24 corresponds to a first display unit (1ST DISP).

The sub microcomputer 21 is a one-chip microcomputer and operates with a NOR type flash memory 22 attached externally. The sub microcomputer 21 performs, mainly, communication connection of an in-vehicle network by a vehicle controller area network (V-CAN) and a multimedia controller area network (M-CAN). The sub microcomputer 21 controls a LED driver 23 for driving a backlight LED (BK LIGHT LED) 25 included in the LCD unit 24. The LED driver 23 drives the backlight LED 25 included in the LCD unit 24 to turn on. The LCD unit 24 includes the backlight LED 25, an LCD control circuit (LCD CONT CIRC) 26, and a liquid crystal screen (LCD SCREEN) 27. The LCD control circuit 26 controls a display of the liquid crystal screen 27.

The decoder 18 receives video signals from a rear camera (REAR CAM) 28, from a side-view camera (SIDE VW CAM) 29, and from an analog video output device (ANALG VD OUTPUT DEVICE) 30. The rear camera 28, the side-view camera 29, and the analog video output device 30 are positioned outside of the in-vehicle device. The decoder 18 converts the analog video signal to DRGB signal and selectively outputs, to the LCD unit 24 in response to a control signal transmitted from the main CPU 4 or the sub microcomputer 21, DRGB format drawing data transmitted from the main CPU 4 and a DRGB format video signal transmitted from the cameras 28 to 30. The decoder 18 performs RGB to YUV convert to the drawing data in DRGB format and outputs the converted YUV422 format data to the video processing ASIC 11.

Figure 1:
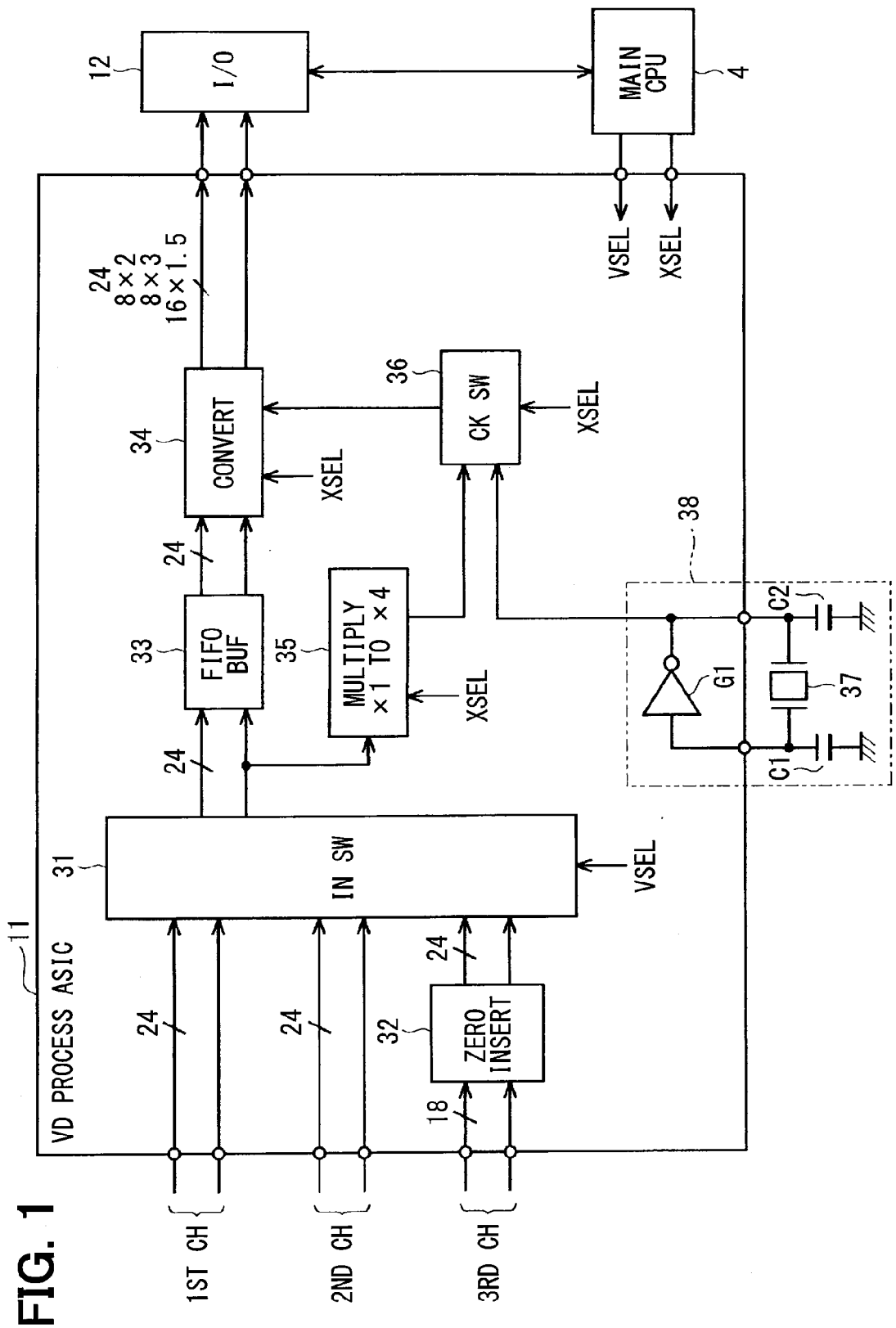
FIG. 1 is a block diagram schematically illustrating an electric configuration of an application specific integrated circuit (ASIC) for video processing according to an embodiment of the present disclosure.

FIG. 1 is a block diagram showing a configuration of the video processing ASIC. The ASIC 11 functions as a selector, and includes an input switch unit (IN SW) 31, a zero inserting unit (ZERO INSERT) 32, a first-in first-out buffer (FIFO BUF) 33, a format converting unit (CONVERT) 34, a multiplying unit (MULTIPLY) 35, and a clock switch (CK SW) 36.

The zero inserting unit 32 receives a video signal in RGB 666 format from a third channel (3RD CH), converts the received video signal in RGB666 format to a video signal in RGB888 format, and outputs the converted signal to the input switch unit 31 synchronously based on a clock signal. Specifically, when converting the video single, the zero inserting unit 32 inserts zero in each lower two bits of the received RGB 666 format video signal and to obtain the RGB888 format video signal having 24 bits of data.

The input switch unit 31 selects one of a 24-bit input from the first channel (1ST CH), a 24-bit input from the second channel (2ND CH), and a 24-bit input from the zero inserting unit 32 in accordance with a selection signal VSEL transmitted from the main CPU 4. Then, the input switch unit 31 outputs the signal transmitted from the selected channel to the FIFO buffer 33. That is, the signal inputted to the input switch unit 31 is unfied to 24-bit signal.

The FIFO buffer 33 is temporarily stores the inputted 24-bit video signals, and adjusts a read and write timing of the video signals. A buffering capacity of the FIFO buffer 33 is set in consideration of the timing deviations between the input clock and the output clocks (delays generated by processes executed in the multiplying unit 35 and in the clock switch 36) and a clock jitter. For example, the buffering capacity may be set to 32 words. The multiplying unit 35 multiplies a clock signal for synchronization (first clock signal) to a different clock signal (second clock signal) by multiplying ×1 to ×4 times (×1, ×1.5, ×2, ×3, ×4) in accordance with a selection signal XSEL, and outputs the second clock signal to the clock switch 36.

The video processing ASIC 11 includes an oscillation circuit 38 constructed by an inverter G1, a crystal oscillator 37, and capacitors C1 and C2. The crystal oscillator 37 and capacitors C1 and C2 are provided at an external side. With this configuration, the ASIC 11 can receive a high performance clock signal which is not influenced by jitter of other circuit components. The oscillation circuit 38 outputs a clock signal generated by the crystal oscillator 37 which oscillates at a predetermined frequency. The oscillation circuit 38 is used in a case where a clock signal transmitted together with a video signal from a selected channel among the first to third channels has a poor jitter performance. The oscillation circuit 38 generates a clock signal and outputs the clock signal to the clock switch 36.

The clock switch 36 selects, in accordance with the selection signal XSEL from the main CPU 4, an output clock signal from the multiplying unit 35 or a clock signal generated by the oscillation circuit 38. Then, the clock switch 36 outputs the selected clock signal to the format converting unit 34.

The format converting unit 34 converts formats of video signals accumulated in the FIFO buffer 33. When the input switch unit 31 switches and outputs a video signal in DRGB format received from a channel, the format converting unit 34 converts the output format in accordance with the selection signal XSEL. For example, when an inputted video signal is in DRGB format, the video signal in DRGB format may be output without any format convert. For another example, when an inputted video signal is in DRGB format, a part of the inputted video signal may be removed and only remaining part of the inputted video signal may be output. For another example, when an inputted video signal is in DRGB format, the format converting unit 34 performs RGB to YUV convert for converting the video signal in DRGB format to a video signal in YUV format. The ASIC 11 can also output a raw image. The ASIC 11 can handle any of video signals inputted from the three channels, and output a video signal in RGB format, in YUV format, or the like.

The following will describe the operation executed by the ASIC 11 having the above-described configuration for perform a video processing.

The receiver 8 receives, from the navigation device 10, an 18-bit RGB signal via LVDS. The receiver 8 performs the serial to parallel convert to the LVDS signal, and the converted signal is supplied to the ASIC 11 via the third channel. The zero inserting unit 32 of the ASIC 11 inserts zero in the lower two bits of each signal segment of RGB666 (18 bits) format to obtain RGB888 (24 bits) format signal. Then, the zero inserting unit 32 outputs the RGB888 format signal to the input switch unit 31 according to a synchronization clock signal. The first and second channels of the ASIC 11 can receive 24-bit signals, and the receiver 9 and the decoder 18 receives 24-bit video signal from the external devices. Video signals inputted via the first to third channels are transmitted to the ASIC 11 in format of 24 bits. The input switch unit 31 selects a channel in accordance with the selection signal VSEL transmitted from the main CPU 4, and outputs a video signal inputted from the selected channel to the FIFO buffer 33.

The FIFO buffer 33 stores data. A clock signal is simultaneously input to the FIFO buffer 33 from the selected channel of the input switch unit 31. The multiplier factor of the multiplying unit 35 can be adjusted in steps of 0.5 time from one time to four times, and is switched in accordance with the selection signal XSEL. The multiplying unit 35 multiplies a clock signal output to the FIFO buffer 33 by the multiplier factor that is preliminarily determined in accordance with a format output from the format converting unit 34.

The clock switch 36 selects, as a clock signal to be output, an internal multiplication clock signal or a clock signal transmitted from the external crystal oscillator 37 in accordance with the selection signal XSEL from the main CPU 4. Herein, the clock signal from the external crystal oscillator 37 is used as a multiplied clock signal. Then, the clock switch 36 outputs the selected clock signal to the format converting unit 34.

The following will describe the reason why a clock signal is configured to be selectable. The clock signals transmitted from the receivers 8 and 9 and the decoder 18 have poor jitter performance. When the adverse effect of the jitter is relatively small, the internal multiplication clock may be used as it is. When the adverse effect of the jitter is larger, it is preferable to generate a frequency multiplied clock signal using the external crystal oscillator 37 and use the generated frequency multiplied clock signal. With this configuration, clock signal can be selected in flexible manner with consideration of a performance of a chip included in the system.

The format converting unit 34 receives 24-bit output signal from the input switch unit 31 synchronously according to a clock signal, and performs format convert in the following four patterns. (1) Output the 24-bit signal without performing any process. (2) Among 24-bit output signal, output predetermined eight bits×2 synchronously with a clock signal having a frequency of clock signal×2. (3) Among 24-bit output signal, output predetermined eight bits×3 synchronously with a clock signal having a frequency of clock signal×3. (4) Among 24-bit output signal, output predetermined 16 bits×1.5 ynchronously with a clock signal having a frequency of clock signal×1.5.

FIG. 3 illustrates a format of a video signal output from the navigation device before conversion, FIG. 4 illustrates a video signal after zero insertion by the zero inserting unit, and FIGS. 5 and 6 illustrate corresponding relations between multiplier factors and output formats. As shown in FIG. 3, the following will describe an example of a receiving of a signal from the navigation device 10. Herein, the signal from the navigation device 10 is in RGB666 format and has 18 bits of data. As illustrated in FIG. 4, the zero inserting unit 32 adds zero to lower bits (R1, R0, G1, G0, B1, and B0) of the signal in RGB666 format and obtains 24-bit signal. Thus, in the input switch unit 31 and in the subsequent blocks, all of the internal processes can be performed in 24 bits. Thus, the internal processes become simplified.

After zero insertion, in the case of the pattern (1), the format converting unit 34 outputs 24 bits of the signal as they are. In the case of the pattern (2), as illustrated in FIG. 5, the format converting unit 34 outputs the bits G4 to G2 and B7 to B3 in accordance with the first clock of the clock signal multiplied by two in the multiplying unit 35, and outputs the bits R7 to R3 and G7 to G5 in accordance with the next clock.

In such a manner, by the conversion, the format converting unit 34 can output the bits R7 to R3 (corresponding to R5 to R1 before conversion), G7 to G2 (corresponding to G5 to G0 before conversion), and B7 to B3 (corresponding to B5 to B1 before conversion) in the format of RGB565. At this time, since the format converting unit 34 converts the format to the RGB565 format, as compared with the 18-bit video input of the first time, the information of one lower bit of red (R) and one lower bit of blue (B) is removed. However, it was recognized that the visibility does not deteriorate substantially from the viewpoint of video image characteristics of the navigation device 10.

For example, when the in-vehicle device 1 receives a video signal of the navigation device 10, the in-vehicle device 1 repeatedly displays a still image on the liquid crystal screen 27, thereby displaying a map in the periphery of the position of the subject vehicle and a route to a destination. It was recognized that when YUV format is used as an output video format of the navigation device 10, roughness of a still image is seen more easily. Consequently, the in-vehicle device 1 displays an output video image of the navigation device 10 onto the liquid crystal screen 27 using the format of DRGB 565. As a result, the visibility of the output video image of the navigation device 10 is less likely to deteriorate.

In the case of the pattern (3), as illustrated in FIG. 6, the multiplying unit 35 multiplies the clock signal by three. In this case, the format converting unit 34 outputs eight bits of red (R) in accordance with the first clock of the multiplication clock signal, outputs eight bits of green (G) in accordance with the next clock, and outputs eight bits of blue (B) in accordance with the further next clock.

When a video signal is received in the video format of YUV422 from the AV board 13 or the decoder 18, the ASIC 11 outputs the video signal in the video format as it is or shapes the waveform of the video signal and outputs the waveform-shaped signal to the I/O unit 12.

Consequently, the ASIC 11 can properly convert a signal in accordance with the input bit width of the main CPU 4 and output the converted signal. For example, when the main CPU 4 is able to receive only 8-bit width input, the ASIC 11 processes an inputted signal to 8-bit signal, and outputs the 8-bit signal. When the main CPU 4 is able to receive a 16-bit width input, the ASIC 11 outputs 16-bit signal. That is, the ASIC 11 outputs the signal in a flexible manner in accordance with a property of the main CPU 4.

(Use Method of Video Processing ASIC 11 in a Different System)

Figure 7:
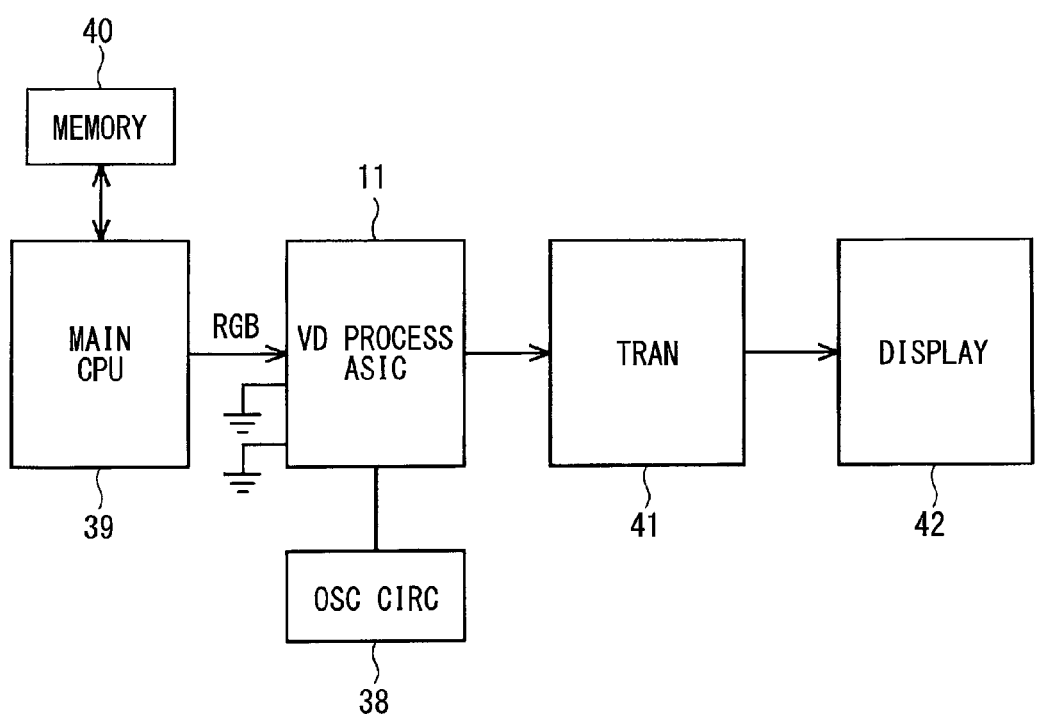
FIG. 7 is a block diagram illustrating an electric configuration of a main part of a circuit for a use of video processing purpose ASIC in another method.

FIG. 7 illustrates explanation of another use method of the video processing ASIC 11. As illustrated in FIG. 7, a main CPU (MAIN CPU) 39 is connected at the anterior stage of the video processing ASIC (VD PROCESS ASIC) 11. Although the main CPU 39 has a function similar to that of the main CPU 4, the main CPU 39 can output a 24-bit video signal.

That is, in this system, the main CPU 39 is connected to a memory (MEMORY) 40, and outputs a 24-bit video signal in RGB888 format. The ASIC 11 receives the 24-bit video signal, shapes a waveform of a clock signal of the video signal using the external oscillation circuit (OSC CIRC) 38, and outputs the video signal together with the shaped clock signal to a transmitter (TRAN) 41. The transmitter 41 outputs a video image to a display (DISPLAY) 42 by LVDS, and the display 42 performs a display process.

In this system, the second and third channel inputs of the ASIC 11 are made invalid. The video processing ASIC 11 is configured to solve a clock jitter and output a video signal to the transmitter 41. As described above, the video processing ASIC 11 also has a clock waveform shaping function. In such a case as well, the system can be flexibly configured by using the video processing ASIC 11.

In the present embodiment, the video processing ASIC 11 receives a 18-bit video signal (18-bit corresponding to a first bit width) in RGB666 from the navigation device 10 via the receiver 8, converts the 18-bit video signal in RGB666 format to a video format of 8 bits (corresponding to a second bit width: multiple number of eight)×2, and can output the converted signal together with a clock signal multiplied by two. The ASIC 11 can also convert the video signal to a video format of 8 bits×3, such as RGB888 format and output the converted signal together with a clock signal multiplied by three. Consequently, even in the case that the main CPU 4 does not receive a video signal in the video format of RGB666, the video signal of RGB666 is properly processed and the processed signal can be output to the main CPU 4. Since the video processing ASIC 11 removes lower bits at the time of converting a video signal in the video format of RGB666 to a video signal in the video format of RGB565, deterioration in a video image can be suppressed as much as possible.

In the ASIC 11, the zero inserting unit 32 inserts zero as lower bits in accordance with a video signal having the largest bit number among video signals in various formats. Thus, the internal process is simplified. Since the input switch unit 31 switches and outputs video signals in various video formats adjusted to the video signal having the largest bit number (24 bits), the input switch unit 31 can be provided by a selector having a function of selecting 24 bit signal. Therefore, the input switch unit 31 can be simply configured. With this configuration, video signals in various video formats each having an arbitrary bit width can be received and selectively output, and video signal processing can be carried out in a flexible manner.

Since the clock switch 36 can output a clock signal transmitted from the oscillation circuit 38 and generated by the crystal oscillator 37, for example, even when the clock signals input from the receivers 8 and 9 have poor jitter performance, the influence of the jitter can be eliminated.

For example, even when the standard of an input video format of the general main CPU 4 is limited, the ASIC 11 can switch the video format and output a converted signal, and supports a flexible processing of the video signals.

In the foregoing embodiments, an example has been described in which the ASIC 11 receives a video signal in the video format of YUV422 from the AV board 13 and the decoder 18 and outputs the video signal as it is to the I/O unit 12. Alternatively, since the video processing ASIC 11 can receive a video signal of 24 bits, the video processing ASIC 11 may also receive video signals in various video formats (color spaces) of RGB444, RGB888, and the like. Then, the video processing ASIC 11 may adjust the signals to the input bit width of the main CPU 4, and output the converted signals.

In any case of using the general main CPU 4 as described above or a custom main CPU conventionally used for vehicle control, by using the ASIC 11, a system adapted to various video formats can be flexibly configured, and the present disclosure can be applied to various systems.

In the foregoing embodiments, the receivers 8 and 9 correspond to a video signal receiving unit, the navigation device 10 corresponds to an external video device, the video processing ASIC 11 corresponds to a vehicular video processing device, the AV board 13 corresponds to an external video device, the format converting unit 34 corresponds to an output unit, the clock switch 36 corresponds to a clock output unit, and the crystal oscillator 37 corresponds to a clock stabilizing circuit.

The above-described disclosure includes the following modes.

According to an aspect of the present disclosure, the vehicular video processing device 11 includes the clock output unit 36 and the output unit 34. A video signal output from the external video device 10 or 13 and having a predetermined video format and a first bit width is input to the vehicular video processing device 11 via the video signal receiving unit 8 or 9 together with a first clock correlated to the video signal. The clock output unit 36 outputs a second clock signal having a frequency acquired by multiplying a frequency of the first clock signal by a predetermined multiplier factor. The output unit 34 converts the video signal having the first bit width to a video signal having a second bit width in accordance with the multiplier factor and outputs the video signal having the second bit width together with the second clock signal. The second bit width is smaller than the first bit width.

With above-described configuration, when a video signal has a format and a bit width which are not suitable to directly input from an external video device to a device on the output side, the format of the video signal is converted to have a second bit width in accordance with predetermined multiplier factor. Consequently, the video signal in the converted video format can be properly processed and input to the device on the output side.

Further, at the time of converting the format of the video signal having the first bit width to the format having the second bit width, the output unit 34 may remove at least one lower bit from the first bit width.

Further, the video signal receiving units 8, 9 have respective multiple channels, the external video device has multiple sub devices 10, 13, and multiple channels of the video signal receiving units 8, 9 may be connected to the multiple sub devices 10, 13, respectively. In this case, multiple video signals having different video formats are supplied from the multiple sub devices to the multiple channels. One of the video signals which has a largest bit width may be referred to as a specific video signal. The vehicular video processing device 11 may further include a zero inserting unit 32 and an input switch unit 31. The zero inserting unit 32 may repeatedly insert zero to at least one lower bit of each of the video signals other than the specific video signal until a bit width of each of the video signals becomes equal to the bit width of the specific video signal. The input switch unit 31 selects and outputs one of the video signals each having an equal bit width with the bit width of the specific video signal. The output unit 34 converts the video signal output from the input switch unit to the video signal having the second bit width and outputs the video signal that is converted to have the second bit width. The zero inserting unit 32 inserts zero in lower bits in accordance with the specific video signal having the largest bit number among the video signals in different formats. Thus, the internal process can be simplified. Since the input switch unit 31 switches and outputs video signals in different video formats and adjusted to the video signal of the largest bit width, the input switch unit 31 can be provided by a selector having a function of selecting predetermined bits corresponding to the largest bit number. Thus, the configuration of the input switch unit can be further simplified. Consequently, video signals in multiple video formats each having an arbitrary bit width can be received and output selectively, and processing of the video signals can be carried out in a flexible manner.

The multiple sub devices are provided by, for example, the navigation device 10 and the digital video signal output device 13 that operates under a predetermined standard.

Further, the external video device may include the navigation device 10. The video signal having the first bit width is, for example, a video signal in an RGB666 format, and the video signal having the second bit width is, for example, a video signal in an RGB565 format. The output unit 34 converts the video signal in the RGB666 format, which is inputted from the navigation device 10 via the video signal receiving unit 8, to the video signal in the RGB565 format, and outputs the video signal in the RGB565 format.

Further, the clock output unit 36 may generate a clock signal having a frequency equal to a frequency of the first clock signal or generate a clock signal having a frequency acquired by multiplying the frequency of the first clock signal using a clock stabilizing circuit 37, and may output the clock signal that is generated instead of the first clock signal inputted from the external video device 10, 13 via the video signal receiving unit 8, 9.

According to another aspect of the present disclosure, the vehicular video processing system 1 includes the above-described vehicular video processing device 11, a video signal receiving unit 8, 9, and a main central processing unit 4. The video signal receiving unit 8, 9 is connected to the vehicular video processing device 11, receives a video signal from an external video device 10, 13, converts the video signal to a signal having a predetermined video format and a first bit width, and outputs the resultant signal to the vehicular video processing device 11. The main central processing unit 4 receives a video signal having a second bit width output from the vehicular video processing device 11.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A vehicular video processing device receiving a plurality of video signals output from respective external video devices via respective channels of a video signal receiving unit, the plurality of video signals having respective video formats and respective bit widths, the respective bit widths being different from one another, each of the plurality of video signals being transmitted together with a first clock signal, the vehicular video processing device comprising:
a clock output unit outputting a second clock signal having a frequency acquired by multiplying a frequency of the first clock signal by a predetermined integer multiplier factor;
an input switch unit successively selecting, in accordance with a video selection signal, one of the plurality of video signals that are inputted, and setting a bit width of the selected video signal to a first bit width; and
an output unit successively converting, in accordance with a clock selection signal and the integer multiplier factor, the video signal that is selected by the input switch to a video signal having a second bit width and outputting, to an output destination, the video signal that is converted to have the second bit width together with the second clock signal, the second bit width being smaller than the first bit width, wherein the video selection signal and the clock selection signal are transmitted from the output destination.

2. The vehicular video processing device according to claim 1, wherein
when the output unit converts the video signal that is selected by the input switch unit and having the first bit width to the video signal having the second bit width, the output unit removes at least one lower bit from the first bit width.

3. The vehicular video processing device according to claim 1, further comprising:
a zero inserting unit, wherein
one of the plurality of video signals which has a largest bit width is referred to as a specific video signal,
the zero inserting unit inserts zero to at least one lower bit of each of the plurality of video signals other than the specific video signal until a bit width of each of the plurality of video signals becomes equal to the bit width of the specific video signal,
the input switch unit successively selects and outputs one of the plurality of video signals having an equal bit width with the bit width of the specific video signal, and
the output unit converts the video signal output from the input switch unit to the video signal having the second bit width and outputs, to the output destination, the video signal that is converted to have the second bit width.

4. The vehicular video processing device according to claim 3, wherein
the external video devices include a navigation device and a digital video signal output device that operates under a predetermined standard.

5. The vehicular video processing device according to claim 1, wherein
the external video devices include a navigation device,
the video signal having the first bit width is a video signal in an RGB666 format,
the video signal having the second bit width is a video signal in an RGB565 format, and
the output unit converts the video signal in the RGB666 format, which is input from the navigation device via the video signal receiving unit, to the video signal in the RGB565 format, and outputs the video signal in the RGB565 format.

6. The vehicular video processing device according to claim 1, wherein
the clock output unit generates a clock signal having a frequency equal to the frequency of the first clock signal or generates a clock signal having a frequency acquired by multiplying the frequency of the first clock signal using a clock stabilizing circuit, and
the clock output unit outputs the clock signal that is generated instead of the first clock signal inputted from each of the external video devices via the video signal receiving unit.

7. A vehicular video processing system comprising:
the vehicular video processing device according to claim 1;
a video signal receiving unit connected to the vehicular video processing device, wherein the video signal receiving unit receives a plurality of video signals from respective external video devices, converts each of the plurality of video signals which are received to a video signal having a predetermined video format and a first bit width, and outputs the video signal that is converted to the vehicular video processing device; and a main central processing unit receiving, from the vehicular video processing device, a video signal having a second bit width.

8. A vehicular video processing device receiving a video signal output from an external video device via a video signal receiving unit, the video signal having a predetermined video format and a first bit width and being transmitted together with a first clock signal, the vehicular video processing device comprising:

a clock output unit outputting a second clock signal having a frequency acquired by multiplying a frequency of the first clock signal by a predetermined multiplier factor;

an output unit converting the video signal having the first bit width to a video signal having a second bit width in accordance with the multiplier factor and outputting the video signal that is converted to have the second bit width together with the second clock signal, and the second bit width being smaller than the first bit width;

a zero inserting unit; and an input switch unit, wherein the video signal receiving unit includes a plurality of channels and the external video device includes a plurality of sub devices, the channels of the video signal receiving unit are connected to the sub devices of the external video device, respectively, and the sub devices transmit a plurality of video signals having different predetermined video formats to the respective channels, one of the video signals which has a largest bit width is referred to as a specific video signal, the zero inserting unit inserts zero to at least one lower bit of each of the video signals other than the specific video signal until a bit width of each of the video signals becomes equal to the bit width of the specific video signal, the input switch unit selects and outputs one of the video signals each having an equal bit width with the bit width of the specific video signal, the output unit converts the video signal output from the input switch unit to the video signal having the second bit width and outputs the video signal that is converted to have the second bit width, and the second bit width is equal to a bit width used in an output destination or a multiple number of the bit width used in the output destination.

9. The vehicular video processing device according to claim 8, wherein when the output unit converts the video signal having the first bit width to the video signal having the second bit width, the output unit removes at least one lower bit from the first bit width.

10. The vehicular video processing device according to claim 8, wherein the sub devices include a navigation device and a digital video signal output device that operates under a predetermined standard.

11. The vehicular video processing device according to claim 8, wherein the external video device includes a navigation device, the video signal having the first bit width is a video signal in an RGB666 format, the video signal having the second bit width is a video signal in an RGB565 format, and the output unit converts the video signal in the RGB666 format, which is input from the navigation device via the video signal receiving unit, to the video signal in the RGB565 format, and outputs the video signal in the RGB565 format.

12. The vehicular video processing device according to claim 8, wherein the clock output unit generates a clock signal having a frequency equal to the frequency of the first clock signal or generates a clock signal having a frequency acquired by multiplying the frequency of the first clock signal using a clock stabilizing circuit, and the clock output unit outputs the clock signal that is generated instead of the first clock signal inputted from the external video device via the video signal receiving unit.

13. The vehicular video processing device according to claim 8, wherein the input switch unit selects, in accordance with a video selection signal, one video signal from the plurality of video signals, the output unit converts, in accordance with a clock selection signal, the selected one video signal to the video signal having the second bit width and outputs the video signal that is converted to have the second bit width to an output destination, and the video selection signal and the clock selection signal are transmitted from the output destination.

* * * * *